United States Patent [19]
Anderson

[11] Patent Number: 5,513,492
[45] Date of Patent: May 7, 1996

[54] HYDRAULIC MASTER CYLINDER

[75] Inventor: Robert A. Anderson, Solihull, England

[73] Assignee: Lucas Industries Public Limited Company, England

[21] Appl. No.: 507,965

[22] Filed: Jul. 27, 1995

Related U.S. Application Data

[63] Continuation of Ser. No. 184,461, Jan. 18, 1994, abandoned.

[30] Foreign Application Priority Data

Jan. 21, 1995 [GB] United Kingdom .................. 9301176

[51] Int. Cl.⁶ .................................................. B60T 11/28
[52] U.S. Cl. ........................................................ 60/589
[58] Field of Search ...................................... 60/587, 589

[56] References Cited

FOREIGN PATENT DOCUMENTS

| | | | |
|---|---|---|---|
| 3418031 | 5/1984 | Germany . | |
| 872346 | 10/1981 | U.S.S.R. ................................ | 60/589 |
| 2067252 | 7/1981 | United Kingdom .................... | 60/589 |
| 2219369 | 12/1989 | United Kingdom . | |

Primary Examiner—F. Daniel Lopez
Attorney, Agent, or Firm—Andrus, Sceales, Starke & Sawall

[57] ABSTRACT

An hydraulic master cylinder has a cylinder body containing a valve of which a valve element cooperates with a valve seat carried by a piston, the piston performing a working movement, in use, to compress fluid in a pressure chamber of the body. The valve element and valve seat are relatively movable to permit opening and closing of the valve. A first abutment is arranged to set the retracted position of the piston and a second abutment, spaced from the first one in a direction opposite to the working piston movement, serves to hold the valve element in a desired open position when the piston is in its retracted position. The first and second abutments are both formed on a sleeve surrounding the piston.

14 Claims, 2 Drawing Sheets

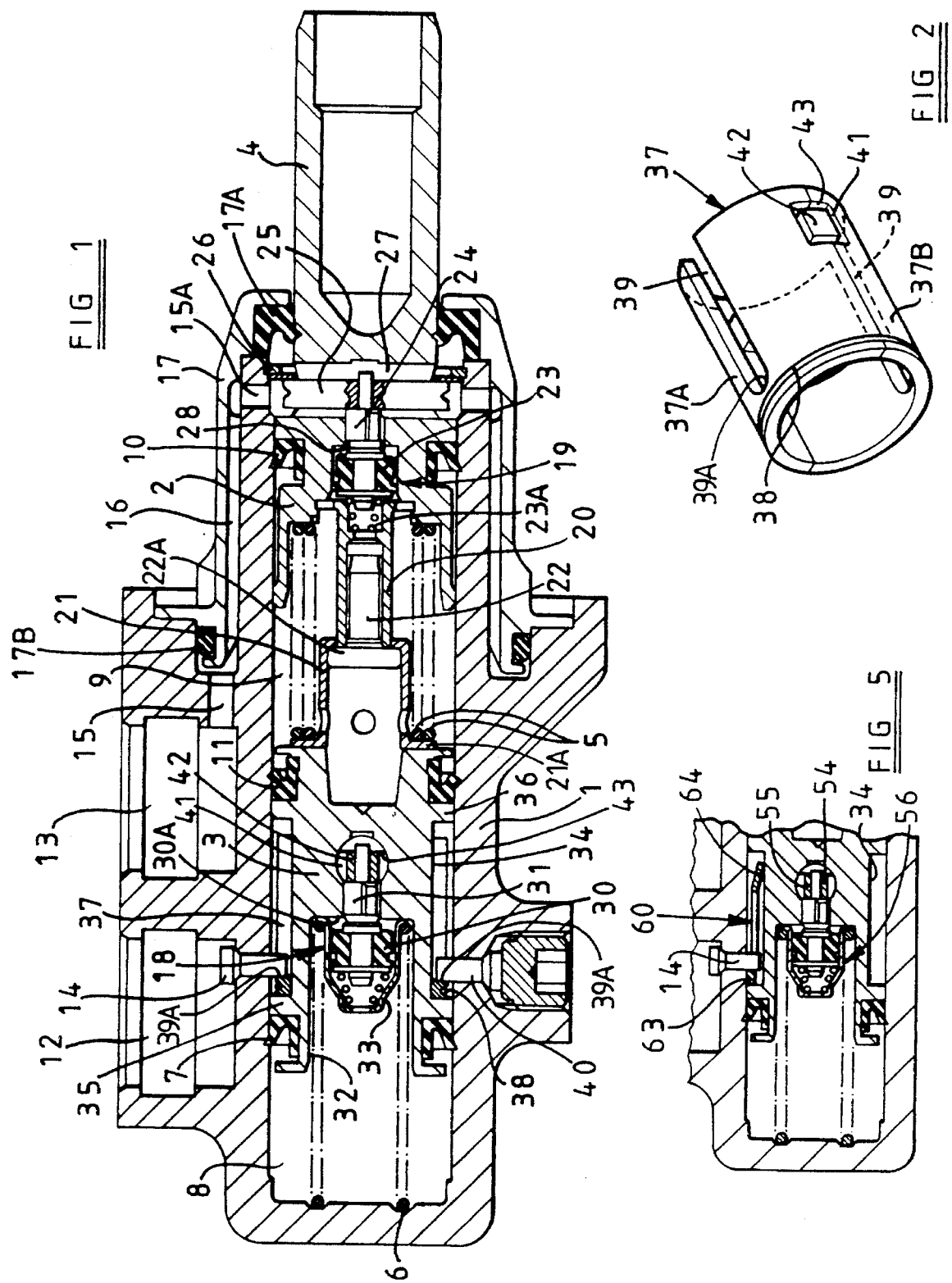

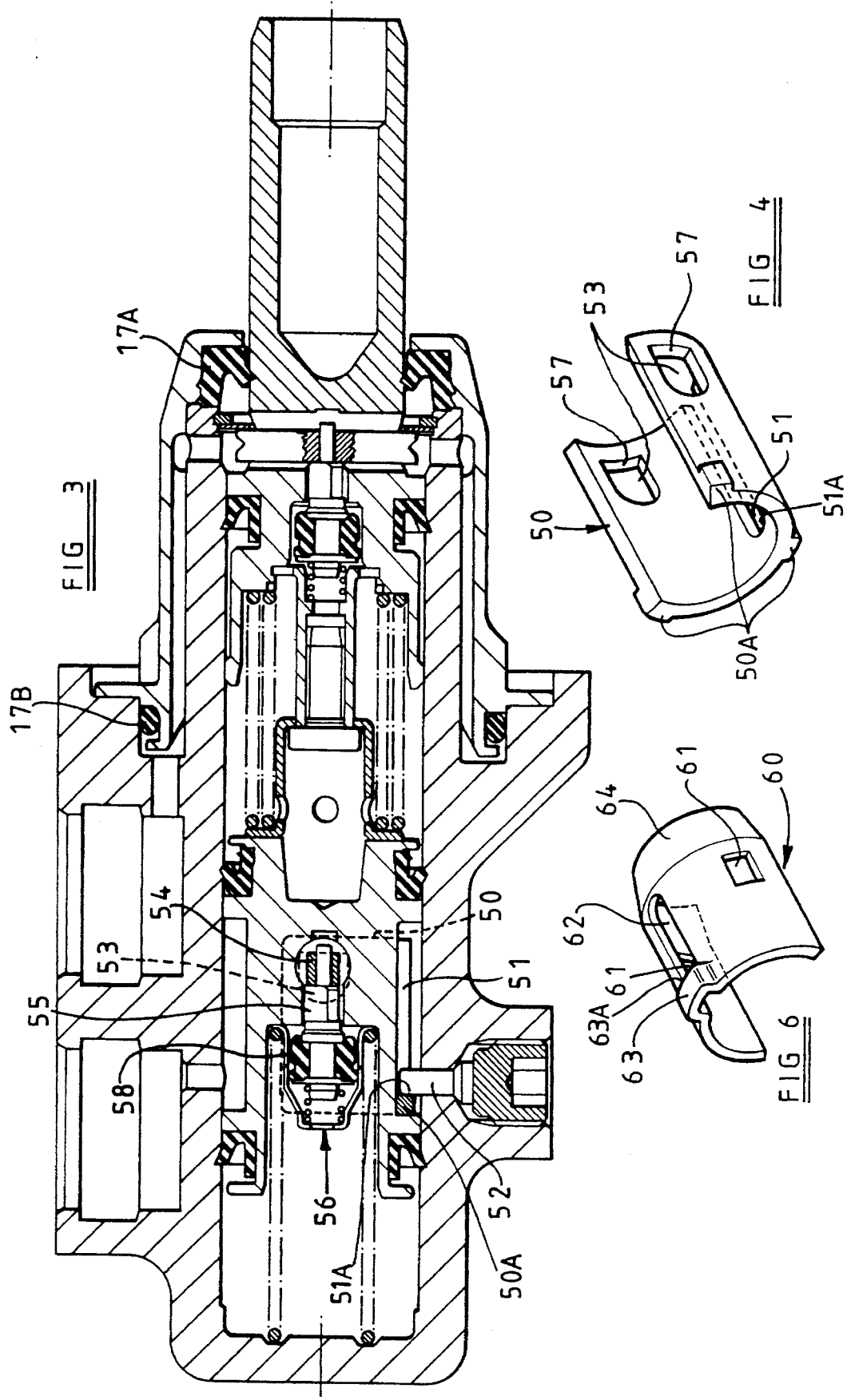

HYDRAULIC MASTER CYLINDER

This is a continuation of application Ser. No. 08/184,461, filed Jan. 18, 1994, now abandoned.

This invention relates to an hydraulic master cylinder primarily for use in a vehicle hydraulic braking system, and including a cylinder body containing a valve of which a valve element cooperates with a valve seat carried by a piston slidable in the body, the piston performing a working movement, in use, to compress fluid in a pressure chamber of the body, the valve element and valve seat being relatively movable to permit opening and closing of the valve.

Our German Gebrauchsmunster No. G8812281.6 describes a master cylinder of the general kind referred to above in which a fixed abutment pin extends through the cylinder wall and acts to set both the retracted position of the secondary piston and the fully open position of the associated valve when the piston is retracted. In this arrangement, the valve mechanism is carried in a portion of the piston which extends forwardly of the abutment pin, necessitating for its accommodation a length of cylinder in addition to that required for the pressure chamber associated with the piston and giving rise inherently to a relatively long cylinder.

An object of the invention is to provide a master cylinder of the kind referred to above which is of reduced length compared with some conventional cylinders.

According to the present invention, an hydraulic master cylinder comprises a cylinder body containing a valve of which a valve element cooperates with a valve seat carried by a piston slidable in the body, the piston performing a working movement, in use, to compress fluid in a pressure chamber of the body, the valve element and valve seat being relatively movable to permit opening and closing of the valve, a first abutment arranged to set the retracted position of the piston, and a second abutment which is spaced from the first abutment in a direction opposite to the piston working movement and serves to hold the valve element in a desired open position when the piston is in its retracted position.

Preferably, the first and second abutments are relatively fixed and conveniently carried by a single component which is preferably carried by and movable with the piston.

Typically, the component is a sleeve at least partially surrounding the piston, the sleeve co-acting with a stop fixed to the cylinder body to set the retracted position of the piston and with means carried by the valve element to set the open position of the latter.

In one practical arrangement, the means carried by the valve extends transversely through an opening in the sleeve and abuts a surface defining the opening in order to set the valve open position. The sleeve conveniently has a longitudinal slot, of which one end forms the first abutment at a location adjacent the forward end of the sleeve, the opening in the sleeve forming the second abutment being formed towards the opposite end of the sleeve.

The invention will now be described, by way of example, with reference to the accompanying drawings in which:

FIG. 1 is a longitudinal cross-section of one form of master cylinder of the invention;

FIG. 2 is a perspective view of a component from the master cylinder of FIG. 1;

FIG. 3 is a view similar to FIG. 1 illustrating an alternative embodiment of the master cylinder of the invention;

FIG. 4 is a perspective view of a component from the master cylinder of FIG. 3;

FIG. 5 is a fragmentary cross-sectional view illustrating part of a further alternative embodiment of the master cylinder of the invention, and FIG. 6 is a perspective view of a component of the master cylinder of FIG. 5.

Referring to the drawings, these show a tandem master cylinder having a cylinder body 1 containing primary and secondary pistons, designated respectively 2 and 3, the primary piston having an integrally formed force input rod 4 through which it is actuated from a driver's pedal or a booster device, in known manner. The secondary piston 3 is coupled to the primary piston for simultaneous operation by way of springs 5 acting between the pistons, the combined strength of the springs being more than a secondary piston return spring 6 acting between the secondary piston and the blind end of the cylinder body. The secondary piston carries a forward seal 7 which, together with the internal cylinder wall, defines a pressure chamber 8. A further pressure chamber 9 is defined between the pistons by a seal 10 carried by the primary piston 2 and a further seal 11 carried at the rear end of the secondary piston 3. The cylinder body 1 provides a pair of reservoir connections 12, 13 which communicate respectively with separate fluid chambers of a fluid reservoir (not shown), the connector 12 communicating with the chamber 8 via a flow path through a tubular member 14, which also acts as a piston abutment in the manner to be described, and the connector 13 communicating with the chamber 9 via a further flow path formed by a longitudinal passage 15 in the body, an annular gap 16 between part of the body and a surrounding end cap 17, and a radial port 15A in the cylinder wall. The end cap 17 serves to close the open end of the cylinder and carries a first seal 17A which seals around the input rod 4 and another seal 17B which seals against an internal surface of the body 1.

Fluid flow between the connector 12 and chamber 8 is controlled by a centre valve assembly, indicated generally at 18, and a further centre valve assembly 19 controls the flow of fluid between the connector 13 and chamber 9. The spacing between the primary and secondary pistons is set by a sleeve assembly, of which a first relatively small diameter portion 20 is fixed to the primary piston 2 and a second relatively large diameter portion 21, surrounding and slidable on the first portion, abuts and is held against the secondary piston 3 by the springs 5 which abut against a radial flange 21A of this second portion. The sleeve portion 20 is internally threaded and receives a screw 22, of which an enlarged head 22A abuts a shoulder formed by the sleeve portion 21. The distance between the pistons may thus be set by adjusting the position of the screw 22 within the sleeve portion 20, causing the sleeve portions to move relative to each other under the action of the springs 5, thereby altering the length of the sleeve assembly.

The centre valve assembly 19 includes a valve head 23 of resilient material, such as rubber or plastics, and a valve stem 24 rigidly secured to a cross member 25 which, in the illustrated rest condition of the cylinder, abuts against a cylinder end abutment in the form of a circlip 26 housed in a groove of the cylinder body. The primary piston is provided with a transverse opening 27 to permit a predetermined relative movement between the piston and the abutment, in the manner to be described. The cross member 25 engages the abutment 26 in the rest condition of the cylinder in order to hold the valve member 23 in its fully open position relative to its opposing valve seat 28 on the piston.

The centre valve assembly 18 associated with the secondary piston 3 has a head 30 and stem 31 similar to the valve assembly 19 described above. The valve head 31 lies within an internal bore 32 of the secondary piston and is housed within a cage 33, the inner end of which provides an abutment which is trapped in place by the return spring 6.

The secondary piston has an elongate portion 34 of smaller diameter than the remainder defined by a pair of seal-supporting flanges 35, 36 of the piston.

The piston portion 34 is surrounded by a cylindrical sleeve 37, which as can be seen clearly from FIG. 2, is composed of a pair of half-cylindrical parts 37A, 37B which are placed in position around the piston and held together by a circlip 38. The sleeve portions 37A, 37B are formed with respective diametrically opposed longitudinal slots 39 within which are received respectively the abutment pin 14 already referred to and a further abutment pin 40 screwed into the cylinder body at a location diametrically opposed to the pin 14. When the secondary piston is retracted under the action of the return spring 6, the sleeve 37 abuts the piston flange 35 and the closed ends 39A of the slots act as abutments engaging the pins 14, 40 to set the rest positions of the pistons. The mating sleeve portions 37A, 37B form a pair of diametrically opposed openings 41 spaced from the closed ends 39A of the slots 39 in the direction opposed to the working movement of the piston. Through these openings is received a transversely extending stop bar 42 carried by the valve stem 31. The dimensions of the openings and bar longitudinally of the cylinder are chosen so that, when the secondary piston 3 is in its illustrated rest position, the stop bar 42 engages the right hand internal edges 43 of the openings 41 which act as abutments to set the fully open position of the valve member 30, in the manner to be described.

With the pistons in their illustrated rest positions, the pressure chambers 8 and 9 are connected to the respective reservoir chambers via the connectors 12, 13, the fluid flow paths previously referred to and the open valves 18, 19. When actuating force is applied to the input rod 4, the pistons 2 and 3 move forward simultaneously and the centre valves close in order to permit the build-up of pressure in the chambers 8 and 9. The cross member 25 is initially in engagement with the circlip 26 under the action of a spring 23A acting via the valve element 23 and its stem 24. The valve element 23 thus remains stationary during the initial inward movement of the piston 2 until a valve seat 28 on the piston engages the opposing surface of the valve element 23 to close the valve and isolate the chamber 9 from the associated reservoir chamber. Further forward movement of the piston will carry the valve element and its stem, together with the cross member 25 forwardly, the valve remaining closed. Simultaneously, forward movement of the piston 3 engages the piston seat 30A with the valve element 30 to isolate the chamber 8 from its associated reservoir chamber and continued forward movement of the piston moves the valve element forward and pulls the valve stem 31 and the transverse abutment 42 away from the edges 43 of the openings 41 in the sleeve 37. When the actuating force is removed, the pistons are returned towards their original positions by the springs 5 and 6 and the valve elements will follow them until the cross member 25 re-engages the circlip 26 and the stop bar 42 re-engages the adjacent edges 43 of the sleeve openings 41, whereupon the final part of the piston travel serves to move the pistons away from the valve elements and thereby re-open the valves. The valves are then held in their fully open positions until working movement of the pistons is next initiated.

The embodiment illustrated in FIG. 3 of the drawings is essentially similar to that of FIG. 1, but incorporates an alternative form of abutment sleeve, which is illustrated in detail in FIG. 4. This can be seen to be in the form of a part-cylindrical unitary sleeve 50 which is slotted at 51 to receive an abutment pin 52 extending through the cylinder wall and engaging the closed end 51A of the slot, as previously. Externally projecting pads 50A may be provided on the external surface of the sleeve adjacent its forward edge for low friction rubbing against the cylinder wall and, in the case of the central one, to provide an increased abutment surface for the pin 52. The sleeve is provided with diametrically opposed openings 53 to receive a transversely extending stop bar 54 carried by the stem 55 of a centre valve assembly 56, as previously. The stop bar engages the right hand internal edges 57, when the pistons are in their illustrated rest positions, in order to set the fully open position of the valve member 58 of the centre valve assembly 56, in the manner described previously. The peripheral extent of the sleeve 50 is such that it is substantially more than semi-cylindrical and extends at either side of the piston beyond the centre line thereof. The inherent resilience Of the sleeve can be sufficient to hold it in place on the piston, although it would be possible to provide suitable retention means, if required. It would alternatively be possible to provide a sleeve which is less than semi-cylindrical over the majority of its length, but having an end portion in the region of the slots illustrated in FIG. 4 which has a greater than semi-cylindrical peripheral extent, leaving the openings 53 open at their ends opposed to the edges 57.

Part of a further embodiment of the invention is illustrated in FIGS. 5 and 6, of which FIG. 5 illustrates the forward end portion of the master cylinder, this being similar to the corresponding part of FIG. 1 except for the sleeve 60 which is shown in greater detail in FIG. 6.

The sleeve 60 is of part-cylindrical form, conveniently made as an integral steel pressing, and is provided with diametrically opposed openings 61, as previously, to receive and act as abutments for a bar 54 carried by the stem 55 of a centre valve assembly 56. The upper surface of the sleeve is slotted longitudinally at 62 and a forward portion of the sleeve is pressed outwardly to form a raised pad 63 aligned with the slot 62. The rear end portion 64 of the sleeve is tapered inwardly to an extent such that the internal diameter of the tapered portion is similar to the external diameter of the piston land 34.

In this embodiment, the peripheral extent of the sleeve 60 is such that the sleeve is more than semi-cylindrical and is fitted over the piston 3 in the position shown in FIG. 5 by slight resilient expansion of the sleeve as it passes over the piston and subsequent contraction to the position shown. A hollow peg 14 is passed through the slot 62 in the manner of the FIG. 1 embodiment and contacts the rear edge 63A of the pad 63 to set the piston retracted position. The tapered sleeve portion 64 contacts the piston land 34 and the sleeve is supported between this land and the internal cylinder bore contacted by the pad 63. The operation of the master cylinder is the same as that described for FIG. 1 and the sleeve 60 will be seen to provide first and second abutments respectively by way of the pad 63 and slots 61, resulting in the advantages described previously. Instead of being pressed from steel, the sleeve 60 may alternatively be die-cast, preferably from aluminium.

In any of the embodiments illustrated in FIGS. 1, 3 and 5, the cage 33 (FIG. 1) and its equivalents in FIG. 3 and 5, illustrated as being of thin gauge metal or plastics material, may be replaced by a plastic component of more substantial cross-sectional dimensions made, for example, by injection moulding.

It will be seen that the arrangement of the invention is advantageous in that it enables the valve-setting abutment to be located at a position spaced rearwardly from the abutment(s) at the forward end of the piston, thereby enabling the valve mechanism and its valve-setting abutment to be housed within the piston body, removing necessity for an extra length of piston, as is required in some prior art arrangements. A further advantage of the master cylinders described herein is that the spring 6 can be selected so that, in its collapsed rigid state during operation of the cylinder, it may be housed at least partially and preferably wholly within the bore 32 of the piston 3, thereby contributing further to compactness of the master cylinders.

Although described in relation to a tandem master cylinder, the invention may be applied to a cylinder containing a single piston and associated valve.

We claim:

1. An hydraulic master cylinder comprising a cylinder body containing a valve of which a valve element cooperates with a valve seat carried by a piston slidable in the body, the piston performing a working movement, in use, to compress fluid in a pressure chamber of the body, the valve element and valve seat being relatively movable to permit opening and closing of the valve, a stop fixed to the cylinder body, a first abutment arranged to set a retracted position of the piston by engagement with the stop, and a second abutment which is spaced from and relatively fixed with respect to the first abutment in a direction opposite to the piston working movement and serves to hold the valve element in a desired open position when the piston is in its retracted position, said first and second abutments being carried by a single component, which component is distinct from, carried by and movable with said piston.

2. A master cylinder according to claim 1 wherein said valve element is carried by said piston.

3. An hydraulic master cylinder comprising a cylinder body containing a valve of which a valve element cooperates with a valve seat carried by a piston slidable in the body, the piston performing a working movement, in use, to compress fluid in a pressure chamber of the body, the valve element and valve seating being relatively movable to permit opening and closing of the valve, a stop fixed to the cylinder body, a first abutment arranged to set a retracted position of the piston by engagement with the stop, and a second abutment which is spaced from the first abutment in a direction opposite to the piston working movement and serves to hold the valve element in a desired open position, when the piston is in its retracted position, by engagement with means carried by the valve element, said first and second abutments being carried by a sleeve at least partially surrounding the piston which sleeve is carried by said piston and movable therewith.

4. A master cylinder according to claim 3 wherein the first and second abutments are each respectively disposed to either side of the valve element.

5. A master cylinder according to claim 3 wherein the valve seat is spaced from the first abutment in a direction opposite to the direction of piston working movement.

6. A master cylinder according to claim 3, wherein the means carried by the valve element extends transversely through an opening in the sleeve and abuts a surface defining the opening in order to set the valve open position.

7. A master cylinder according to claim 3, wherein the sleeve has a longitudinal slot of which one end forms the first abutment.

8. A master cylinder according to claim 7, wherein the slot extends to a location adjacent the forward end of the sleeve where it forms the first abutment, the opening in the sleeve being formed towards the opposite end of the latter.

9. A master cylinder according to claim 7, wherein the slot and opening are displaced peripherally of the sleeve by 90°.

10. A master cylinder according to claim 3, wherein the sleeve is composed of two semi-cylindrical portions.

11. A master cylinder according to claim 3, wherein the sleeve is a unitary part-cylindrical element of more than semi-cylindrical extent.

12. A master cylinder according to claim 11, wherein the sleeve is made of resilient material and held within the cylinder body by resilient recovery after insertion therein in deformed condition.

13. A master cylinder according to claim 11, wherein the sleeve is provided at its forward end with a radially projecting portion arranged to bear against the cylinder internal wall and the rear end portion of the sleeve is tapered inwardly to bear against an outer surface of the piston.

14. A master cylinder according to claim 3 including a forward seal carried by the piston and acting with the cylinder body to seal the pressure chamber, and wherein the valve is spaced from the forward seal in a direction opposite to the direction of piston working movement.

* * * * *